United States Patent
Katuri et al.

(10) Patent No.: US 9,530,407 B2
(45) Date of Patent: Dec. 27, 2016

(54) SPATIAL AUDIO DATABASE BASED NOISE DISCRIMINATION

(71) Applicant: Honeywell International Inc., Morristown, NJ (US)

(72) Inventors: SrinivasaRao Katuri, Bangalore (IN); Soumitri N. Kolavennu, Blaine, MN (US); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 28 days.

(21) Appl. No.: 14/301,994

(22) Filed: Jun. 11, 2014

(65) Prior Publication Data

US 2015/0364137 A1    Dec. 17, 2015

(51) Int. Cl.
| | |
|---|---|
| *G10L 15/20* | (2006.01) |
| *H04R 3/00* | (2006.01) |
| *G10L 25/51* | (2013.01) |
| *H04R 19/00* | (2006.01) |
| *H04R 19/04* | (2006.01) |

(52) U.S. Cl.
CPC .............. *G10L 15/20* (2013.01); *G10L 25/51* (2013.01); *H04R 3/005* (2013.01); *H04R 19/005* (2013.01); *H04R 19/04* (2013.01); *H04R 2201/003* (2013.01)

(58) Field of Classification Search
CPC ...... G10L 15/20; G10L 15/22; G10L 21/0208; G10L 25/87; G10L 2021/02166; G10L 15/08; G10L 25/78; G10L 15/063; G10L 15/01; G10L 15/06; G10L 15/02; G10L 2015/223; G10L 15/00; G10L 15/10; G10L 2021/02082; G10L 2021/02087; G10L 2021/02165; G10L 21/02; G10L 21/0216; H04R 3/005
(Continued)

(56) References Cited

U.S. PATENT DOCUMENTS 5,214,707 A * 5/1993 Fujimoto ............ B60R 16/0373
                                                          381/92
8,942,979 B2 * 1/2015 Kim ...................... G10L 15/065
                                                          704/245
(Continued)

FOREIGN PATENT DOCUMENTS

| | | |
|---|---|---|
| EP | 1515305 A1 | 3/2005 |
| WO | 2014143439 A1 | 9/2014 |

OTHER PUBLICATIONS

"Distant-Talking Speech Recognition Based on a 3-D Viterbi Search Using a Microphone Array", Yamada et al, IEEE Transactions on Speech and Audio Processing, Issue 2, Feb. 2002.*
(Continued)

*Primary Examiner* — Marivelisse Santiago Cordero
*Assistant Examiner* — Stephen Brinich
(74) *Attorney, Agent, or Firm* — Brooks, Cameron & Huebsch, PLLC

(57) ABSTRACT

Methods, systems, and computer-readable and executable instructions for spatial audio database based noise discrimination are described herein. For example, one or more embodiments include comparing a sound received from a plurality of microphones to a spatial audio database, discriminating a speech command and a background noise from the received sound based on the comparison to the spatial audio database, and determining an instruction based on the discriminated speech command.

19 Claims, 4 Drawing Sheets

(58) Field of Classification Search
USPC ........ 704/231–234, 226–228, 243–245, 200, 704/205, 220; 381/92–95
See application file for complete search history.

(56) References Cited

U.S. PATENT DOCUMENTS

| | | | |
|---|---|---|---|
| 2002/0022957 A1* | 2/2002 | Kiuchi | G10L 15/20 704/226 |
| 2002/0048376 A1* | 4/2002 | Ukita | H04N 7/15 381/92 |
| 2003/0177006 A1 | 9/2003 | Ichikawa et al. | |
| 2006/0233389 A1* | 10/2006 | Mao | H04R 1/406 381/92 |
| 2014/0316778 A1 | 10/2014 | Venkatesha et al. | |
| 2015/0194152 A1 | 7/2015 | Katuri | |
| 2015/0287422 A1* | 10/2015 | Short | G01S 7/288 704/205 |

OTHER PUBLICATIONS

I. Rodomagoulakis, et al. "Experiments on Far-field Multichannel Speech Processing in Smart Homes." Proceedings 18th International Conference on Digital Signal Processing (DSP 2013), Santorini, Greece, Jul. 2013. 6 pages.

Shimpei Soda, et al. "Handsfree Voice Interface for Home Network Service Using a Microphone Array Network." 2012 Third International Conference on Networking and Computing. Graduate School of System Informatics, Kobe University. 6 pages.

Amaya Arcelus, et al. "Integration of Smart Home Technologies in a Health Monitoring System for the Elderly." 21st International Conference on Advanced Information Networking and Applications Workshops. IEEE Computer Society. 2007. 6 pages.

Shimpei Soda, et al. "Introducing Multiple Microphone Arrays for Enhancing Smart Home Voice Control." The Institute of Electronics Information and Communication Engineers. Graduate School of System Informatics, Kobe University. 6 pages.

Combined Search and Exam from related GB Patent Application No. 1509297, dated Dec. 14, 2015, 5 pp.

* cited by examiner

SPATIAL AUDIO DATABASE BASED NOISE DISCRIMINATION

TECHNICAL FIELD

The present disclosure relates to spatial audio database based noise discrimination.

BACKGROUND

Sound recognition devices can receive and/or record sound in a particular area. For instance, a sound recognition device can recognize and process speech commands received by the device from a speaker (e.g., a person). As an example, a speaker can issue a speech command to a voice-responsive thermostat to raise or lower the temperature of a room, and the thermostat can receive and recognize the command, and adjust the room temperature accordingly.

Previous sound recognition devices may work well in ideal conditions, such as when the speaker is close to the device and/or there is no other (e.g., background) noise in the area. However, if the speaker is not close to the device, and/or if there is background noise (e.g., noise from another speaker, a television, a radio, an appliance, a vacuum cleaner, a barking dog, etc.) present in the area, it may be difficult for previous sound recognition devices to recognize the command issued by the speaker. That is, the performance of previous sound recognition devices may be significantly degraded if the speaker is not close to the device and/or there is background noise present in the area.

DETAILED DESCRIPTION

Figure 1A:
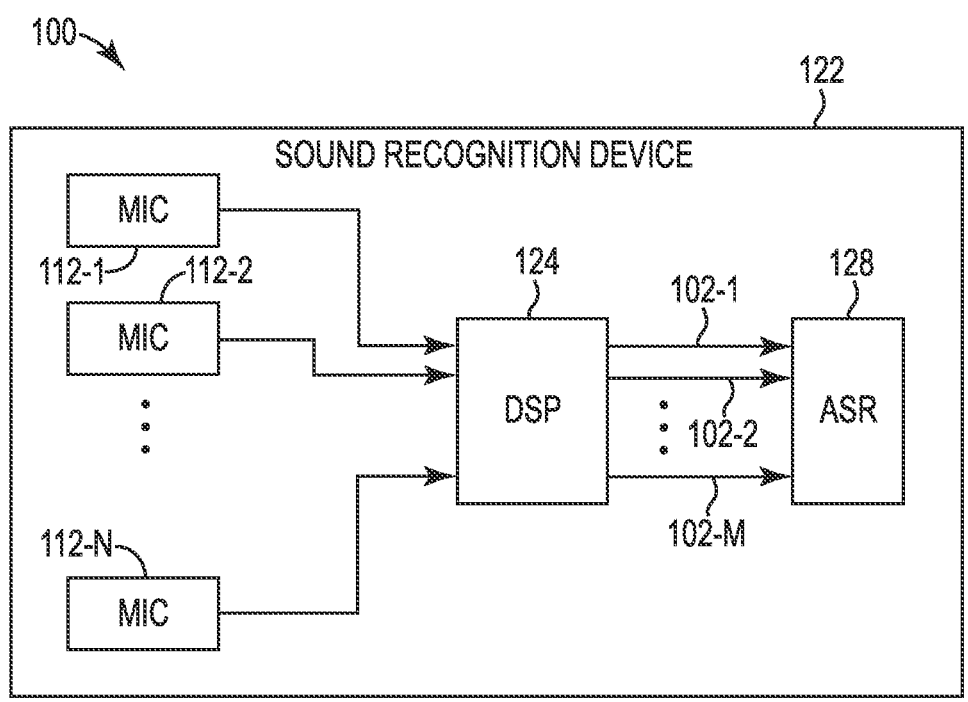
FIG. 1A illustrates a speech recognition system in accordance with one or more embodiments of the present disclosure.

Spatial audio database based noise discrimination methods, systems, and computer-readable and executable instructions are described herein. For example, one or more embodiments include comparing a sound received from a plurality of microphones to a spatial audio database, discriminating a speech command and a background noise from the received sound based on the comparison to the spatial audio database, and determining an instruction based on the discriminated speech command.

As discussed herein, a sound recognition device can be used in a home and/or work environment, among other areas. However, performance of these devices can be in question. In an example, performance of the sound recognition device can be hindered as a result of the sound recognition device failing to recognize a speech command, which can cause user frustration or place the user in danger, depending on where the sound recognition device and/or system is used.

In an example, the presence of background noise can be a reason that the performance of a sound recognition device can be hindered. For instance, the sound recognition device can function by using an automatic speech recognition engine that can decipher a speech command (e.g., user voice) and convert the speech command into a computing device command, which can then be executed by the device. In an example, the speech command can be masked by background noise generated in an area in which the sound recognition device is located.

For instance, if the sound recognition device is located in a work environment, background noise generated by equipment located in the environment can mask the speech command, which can cause a failure in the sound recognition device recognizing the speech command. Alternatively, and/or in addition, if the sound recognition device is located in a home environment, background noise generated by appliances and/or devices can mask the speech command, which can cause a failure in the sound recognition device recognizing the speech command, for example.

To help address the limitations associated with sound recognition devices, systems, methods, and computer-readable and executable instructions are provided for spatial audio database based noise discrimination. Discriminating noise, as used herein, can include separating a speech command from one or more background noises of a received sound based on a comparison to a spatial audio database. The spatial audio database can include a plurality of background noises collected from an area in a spatial format, as further discussed herein. A sound received by a sound recognition device can be compared to the spatial audio database and a speech command and a background noise can be discriminated based on the comparison. For instance, the speech command and background noise can be discriminated using a spatial-temporal filter. The discriminated speech command can be processed by a device and/or system (e.g., to determine an instruction based on the speech command and execute the instruction).

The spatial audio database can be created, for instance, utilizing an adaptive beam former to focus on the background noise and increase a sound quality of the background noise stored in the spatial audio database. For instance, the sound recognition device can include a plurality of microphones (e.g., an array of microphones to form an acoustic beam towards a distance user). The plurality of microphones can capture sounds (e.g., background noise) in an area during installation of the sound recognition device. The sounds can be captured in a spatial format, such as angular portions (e.g., 0-10 degrees, 10-20 degrees, etc.). The sounds stored in the spatial audio database can be used to compare a subsequently captured sound to identify if a background noise exists.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. As will be appreciated, elements shown in the various embodiments herein can be added, exchanged, and/or eliminated so as to provide a number of additional embodiments of the present disclosure. As used herein, "a" or "a number of" refers to one or more. In addition, as will be appreciated, the proportion and the relative scale of the elements provided in the figures are intended to illustrate the embodiments of the present invention, and should not be taken in a limiting sense.

Figure 1B:
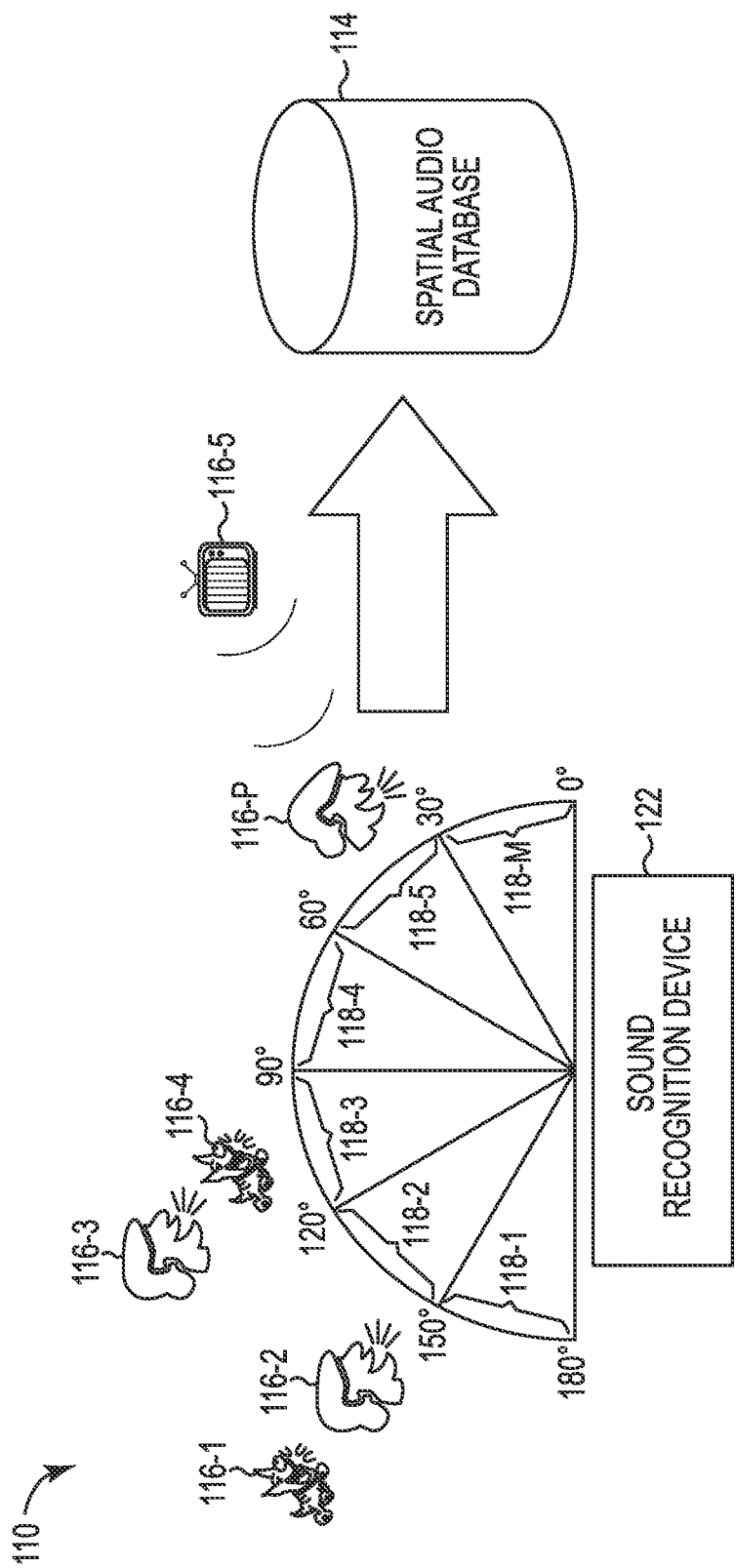
FIG. 1B illustrates an area in which a speech recognition system in accordance with one or more embodiments of the present disclosure may be located and/or operate.

FIG. 1A illustrates a speech recognition system 100 in accordance with one or more embodiments of the present disclosure. As shown in FIG. 1A, speech recognition system 100 can include a sound recognition device 122. FIG. 1B illustrates an area 110 in which speech recognition system 100 (e.g., sound recognition device 122) in accordance with one or more embodiments of the present disclosure may be located and/or operate.

Sound recognition device 122 can be, for example, a thermostat (e.g., a voice-responsive thermostat). However, embodiments of the present disclosure are not limited to a particular type of sound recognition device. For example, in some embodiments, sound recognition device 122 can be a television, microwave, refrigerator, security system, fire system, or any other device that can receive, record, recognize, and/or process sound, such as a speech command.

Area 110, as illustrated in FIG. 1B, can be a room, such as a room of a home (e.g., house, apartment, etc.) and/or work environment, for example. However, embodiments of the present disclosure are not limited to a particular type of area in which speech recognition system 100 (e.g., sound recognition device 122) may be located or operate.

As shown in FIG. 1A, the sound recognition device 122 can include a plurality of microphones 112-1, 112-2, . . . , 112-N. A microphone, as used herein, can include an acoustic-to-electronic transducer that can convert sound in air to an electronic signal. The plurality of microphones 112-1 . . . 112-N can be, for example, an array of microphones. For instance, the plurality of microphones 112-1 . . . 0.112-N can be a four microelectromechanical system (MEMS) microphones. However, embodiments of the present disclosure are not limited to a particular number or type of microphones.

As shown in FIG. 1A, the sound recognition device 122 can include a digital signal processor (DSP) 124. A DSP, as used herein, can include a microprocessor that can perform (e.g., support) digital signal processing. DSP 124 can receive the sound captured by the microphones 112-1 . . . 112-N (e.g., by focusing a main lobe of a beam former to a specific direction at a time) and segregate the captured sound into a plurality of signals (e.g., signals 102-1, 102-2, . . . , 102-M), as illustrated in FIG. 1A. DSP 124 can form signals (e.g., beams) 102-1, 102-2, . . . , 102-M using a beam former algorithm, such as, for instance, a delay-sum, multiple signal classification (MUSIC), or estimation of signal parameters via rotational invariant techniques (ESPRIT) beam former algorithm.

Each respective signal 102-1 . . . 0.102-M can correspond to (e.g., include the sound from) a different portion of the area 110. For example, each respective signal 102-1 . . . 0.102-M can correspond to a different angular portion (e.g., segment) of the area 110 with respect to sound recognition device 122 (e.g., microphones 112-1 . . . 0.112-N). That is, each portion of area 110 can be a different angular portion of the area 110.

For instance, in the example illustrated in FIG. 1B, area 110 includes (e.g., is segmented into) angular portions 118-1, 118-2, 118-3, 118-4, 118-5, . . . , 118-M with respect to sound recognition device 122, and each respective signal 102-1 . . . 0.102-M can correspond to a different one of these angular portions (e.g., signal 102-1 can correspond to portion 118-1, signal 102-2 can correspond to portion 118-2, etc.). That is, in the example illustrated in FIG. 1B, DSP 124 can segregate the sound captured (e.g., the spatial sound) by microphones 112-1 . . . 0.112-N into six different signals 102-1 . . . 102-M, with each of the six signals corresponding to a different angular portion 118-1 . . . 118-M of the area 110. Embodiments of the present disclosure, however, are not limited to a particular number of portions of the area 110, or to a particular number of signals that can be formed by DSP 124.

In the example illustrated in FIG. 1B, each angular portion 118-1 . . . 118-M of the area 110 has the same angular size (e.g., thirty degrees) with respect to the sound recognition device 122. However, embodiments of the present disclosure are not so limited. For example, in some embodiments, area 110 can include angular portions having an angular size of less than thirty degrees (e.g., ten, fifteen, or twenty degrees) or greater than thirty degrees (e.g., forty, fifty, etc.) with respect to the sound recognition device 122. Further, in some embodiments, each angular portion 118-1 . . . 118-M of area 110 may not have the same angular size with respect to the sound recognition device 122 (e.g., two or more of the angular portions may have different angular sizes).

As shown in FIG. 1A, the sound recognition device 122 can include an automatic speech recognizer (ASR) engine 128. The ASR engine 128, as used herein, can include hardware components and/or computer-readable instruction components to recognize a speech command issued by a speaker. The ASR engine 128 can receive signals 102-1 . . . 0.102-M from the DSP 124, and separately (e.g., one at a time) process each of the signals to recognize the speech command issued by the speaker (e.g., determine an instruction). For instance, ASR engine 128 can, for each signal, separate (e.g., distinguish) the speech command from the background noise. That is, ASR engine 128 can isolate and discard the background noise from each signal to recognize the speech command as it is assumed that a speaker and a background noise either intended or unintended may not originate from the same spatial region (e.g., the angular portions) of the area. Thus, the microphones 112-1 . . . 112-N can form the acoustic beam to receive speaker commands and/or background noise along spatial directions to process and/or discriminate the speaker commands from the background noise.

Upon recognition of the speech command, the sound recognition device 122 can take the appropriate action requested by the command. For instance, the sound recognition device 122 can adjust its operation (e.g., its operating parameters) based on (e.g., in response to) the recognized speech command.

As an example in which the sound recognition device 122 is a thermostat, the speaker may issue a speech command to adjust (e.g., raise or lower) the temperature of area 110, either generally or to a specific temperature. ASR engine 128 can recognize the command, and adjust the room temperature accordingly.

In a number of embodiments, the sound captured by the microphones 112-1 . . . 112-N in the area 110 can include a speech (e.g., voice) command issued by a speaker in the area 110, as well as background noise present in the area 110, such as other speech noise (e.g., from another speaker) and/or non-speech noise (e.g., noise from a television, a radio, an appliance, a vacuum cleaner, a barking dog, etc.). As such, in addition to a speech command being captured (e.g., received and/or collected) by the microphones 112-1 . . . 112-N, the microphones 112-1 . . . 112-N can also capture a background noise.

For example, if the microphones 112-1 . . . 112-N are located in a home environment, the background noise can include a noise associated with an appliance such as a dish washer, ventilation system, vacuum cleaner, etc. If the microphones 112-1 . . . 112-N are located in a work environment, the background noise can include a noise associated with a piece of equipment such as a printing press, a power tool, ventilation system, etc.

The background noise can mask the speech command. For instance, the background noise can interfere with a signal associated with the speech command, which can create a corrupted input signal that is captured by the microphones 112-1 . . . 112-N. As a result, the signal associated with the speech command may not be recognized by the sound recognition device 122 (e.g., by the ASR engine 128) and therefore may not be converted into the computing device command.

A spatial audio database 114 can be used to discriminate background noise from speech commands, in various embodiments. As illustrated by FIG. 1B, a sound recognition device 122 can be used to create the spatial audio database 114. The spatial audio database 114 can include sounds 116-1, 116-2, 116-3, 116-4, 116-5, . . . , 116-P captured from the area 110 during installation of the sound recognition device 122. For instance, such a process can include a training mode of the sound recognition device 122.

The microphones 112-1 . . . 112-N can capture sounds 116-1 . . . 116-P from the area 110 during the training mode. For instance, the microphones 112-1 . . . 112-N can capture sounds 116-1 . . . 116-P from a plurality of beam directions and a plurality of beam widths. The beam directions can include predetermined angular portions 118-1 . . . 118-M (e.g., 180 degrees to 150 degrees) corresponding to a plurality of spatial regions of the area 110.

The sounds 116-1 . . . 116-P captured in the area 110 by the microphones 112-1 . . . 112-N can be used to create the spatial audio database 114. The sounds 116-1 . . . 116-P can be stored in a spatial format. For example, a spatial format can include the angular portions 118-1 . . . 118-M of the area 110. The angular portions 118-1 . . . 118-M can be defined, for instance, at predetermined degrees (e.g., every 10 degrees, 20 degrees, 30 degrees, etc.).

For instance, the captured sounds 116-1 . . . 116-P can be processed using a beam former algorithm. As illustrated in FIG. 1A, DSP 124 can receive the sounds 116-1 . . . 116-P captured by the microphones 112-1 . . . 112-N and segregate each of the captured sounds 116-1 . . . 116-P into a plurality of signals (e.g., signals 102-1 . . . 102-M). Each signal 102-1 . . . 102-M can correspond to (e.g., represent) an angular portion 118-1 . . . 118-M of the area 110. The segregated signals for each captured sound 116-1 . . . 116-P can be stored in the spatial audio database 114 (e.g., as a spatial-temporal filter).

As illustrated by FIG. 1B, sounds captured in the area 110 can include human sounds and non-human sounds. The captured sounds 116-1 . . . 116-P can include background noise, for instance. For example, the sounds 116-1 . . . 116-P can include a human speaking, a dog barking, a television and/or other device, and/or a combination thereof.

The captured sounds 116-1 . . . 116-P can analyzed for identification characteristics. The identification characteristics can be used for later recognition of the sounds. For instance, the identification characteristics can be used to create a spatial-temporal filter. The identification character-istics can include frequency, amplitude, spatial power spectrum, instantaneous amplitude, signal-to-noise ratio, and/or other signal characteristics such as pulse width and/or pulse repetitive frequency, etc. of the noise signals associated with the sounds (e.g., background noise). The noise signals in home and/or office environments can be non-random (e.g., can be repetitive) and can therefore aid in recognition of the noise signals (e.g., identifying background noise).

In a number of embodiments, the identification characteristics can include spatial information. For instance, each collected sound 116-1 . . . 116-P can be stored with a reference to the angular portion 118-1 . . . 118-M that the respective sound is captured from and/or associated with.

The spatial audio database 114 can be used to discriminate a speech command and a background noise from a subsequently captured sound based on the comparison to the spatial audio database 114. For instance, discriminating a speech command and a background noise can include separating the speech command from the background noise based on the comparison.

For example, a signal can be received that includes the background noise and a speech command at the sound recognition device 122. As a user speaks the speech command, the background noise can be generated simultaneously, which can interfere with the signal associated with the speech command. As a result, the sound recognition device 122 and/or speech recognition system 100 may not be able to process the speech command due to the interference caused by the background noise. As such, in some embodiments, the spatial audio database 114 can be used to discriminate a speech command from one or more background noises by comparing the signal to the spatial audio database 114.

The comparison to the spatial audio database 114 can, for example, identify if a background noise exists in the received sound. For instance, a background noise can exist based on a threshold comparison of the received sound and a sound stored in the spatial audio database 114. The threshold comparison can include comparing the sound to a signal reception threshold to confirm a type of background noise present and/or if a background noise exists/is mixed with a speech command.

The discrimination can include subtraction techniques to suppress the background noise from the speech command. For example, the subtraction technique can include a spatial-temporal filter. A spatial-temporal filter can result in the ASR engine 128 associated with the sound recognition device 122 being able to recognize the speech command and convert the speech command into the computing device command. When the microphones 112-1 . . . 112-N receive a sound that includes a background noise and a speech command, the background noise can be filtered out using the spatial audio database 114, leaving the speech command to be processed by the ASR engine 128.

In various embodiments, the ASR engine 128 and/or an adaptive noise discrimination component (not illustrated by FIG. 1) can be used to create the spatial audio database 114. An adaptive noise discrimination component can include a sub-component of the ASR engine 128, a separate engine associated with a system (e.g., computing device) of the ASR engine 128, or, alternatively, a component that is separate from the ASR engine 128. The adaptive noise discrimination component can, for instance, include hardware components and/or computer-readable instruction components to create the spatial audio database 114 using the segregated signals, compare a subsequently captured sound to the spatial audio database 114, and/or discriminate a speech command from background noise based on the comparison of the captured sound to the spatial audio database 114.

The ASR engine 128 can determine an instruction from the discriminated speech command. Determining an instruction, as used herein, can include converting the speech command to a computing device command. A computing device command can include a command executable by a computing device (e.g., the sound recognition device 122). For instance, the ASR engine 128 can analyze the discriminated speech command at the defined beam direction and defined beam width.

Further, in some embodiments, the sound recognition device 122 and/or ASR 128 can send feedback to the DSP 124. For instance, the feedback can include an alternate beam angle from the plurality of beam angles and an alternate beam width from the plurality of beam widths to increase a signal to noise ratio of the received speech commands and/or background noises (e.g., during the training mode). The defined beam angle and the defined beam width can be altered to the alternate beam angle and the alternate beam width.

The speech recognition system 100 can be utilized to perform a number of methods. An example method can discriminate a speech command from a background noise in an area 110 to increase accuracy of the sound recognition device 122 as compared to prior solutions.

For example, the plurality of microphones 112-1 . . . 112-N can capture a speech command. The sound recognition device 122 can be associated with an ASR engine 128 that can decipher the speech command and convert the speech command into a computing device command, which can instruct the sound recognition device 122 to perform a function.

Alternatively, the sound recognition device 122 can send the speech command to an external computing system via a network (e.g., cloud network) that includes an ASR engine 128 and the ASR engine 128 can send the converted computing device command to the sound recognition device 122 to perform. The sound recognition device 122 and the ASR engine 128, as well as the DSP 124, can communicate using a network communication.

An example method can further include comparing a sound received from a plurality of microphones 112-1 . . . 112-N to a spatial audio database 114. The plurality of microphones 112-1 . . . 112-N can be associated with a sound recognition device 122.

The method can include discriminating a speech command and a background noise from the captured sound (e.g., segregated into a plurality of signals) based on the comparison to the spatial audio database 114. The comparison to the spatial audio database 114 can identify if a background noise exists in the received sound. And, the method can include determining an instruction based on the discriminated speech command.

In various embodiments, the captured sound can be compared to the spatial audio database 114 based on a confidence level associated with a processed signal. For instance, the ASR engine 128 can process a segregated plurality of signals (associated with a captured sound). Upon processing the signals, a confidence level associated with the processed signals that include the background noise and the speech command can be determined.

In an example, the confidence level associated with the processed signals can be determined based on criteria that include mean square error and/or temporal average of the least squares error, although examples are not so limited. In an example, different algorithms can be used for each criteria, which can include the least mean squares algorithm and/or the recursive least squares algorithm, although examples are not so limited.

Although embodiments are not so limited and, in various embodiments, each signal received can be compared to the spatial audio database 114 and background noise(s) can be filtered based on a threshold comparison. For example, each segregated signal can be compared to the spatial audio database 114 prior to the ASR engine 128 determining an instruction.

In some embodiments, if the confidence level does not meet a threshold level (e.g., is below a threshold level), an indication can be made that the ASR engine 128 may not be able to convert the captured sound into the computing device command. A confidence level, as used herein, can include a percentage that corresponds to a likelihood the determined instruction correctly corresponds the speech command. As such, the captured sound (e.g., the segregated signals) can be compared to a spatial audio database 114 to discriminate a speech command from one or more background noises.

In some embodiments, a spatial-temporal filter can be applied to the signals to filter out the background noise when the processed signal does not meet the confidence level (e.g., in response to identifying) and/or upon receiving a signal. Upon filtering out the background noise from the signal, the speech command can be processed with the ASR engine 128.

In an example, determining whether the background noise is recognized (e.g., exists and/or a previously stored noise) can include determining whether a match exists between the segregated signals and a signal stored in the spatial audio database 114. For instance, identification characteristics of the stored signals can be compared to the identification characteristics associated with the segregated signals. In response to the comparison resulting in an identified background noise (e.g., a match), the background noise can be discriminated from the speech command.

The method can include filtering out the background noise from the signal using the stored spatial-temporal filter. In an example, as discussed herein, the one or more signals (e.g., the background noise and the speech command segregated into a plurality of signals) can be processed using an ASR engine 128. Upon processing the signals, a confidence level associated with the processed signals can be determined, and the spatial-temporal filter can be applied to the signals to filter out the background noise when the processed signals do not meet a threshold confidence level.

For example, once the spatial-temporal filter has been applied to the signals that include the background noise and the speech command, the background noise can be filtered out and the speech command can be processed using the ASR engine 128. After the speech command has been processed, a confidence level can be determined once again to ensure that the processed signal meets the confidence level.

If the processed signal does not meet the confidence level and/or is not within a threshold of the confidence level, a different spatial-temporal filter can be applied to the processed signal and the process can repeat with the ASR engine 128 until the confidence level is met. When the confidence level is met, speech recognition can be performed on the signal and the speech command can be turned into a computing device command, which can instruct the computing device to perform a function.

In some embodiments, a plurality of stored spatial-temporal filters can be applied to the background noise and the speech command to filter out the background noise based on the comparison between the background noise and the plurality of stored spatial-temporal filters.

In response to the comparison resulting in no identified background noise (in response no match), the speech command/captured sound can be sent to the ASR engine 128 to analyze the speech command (e.g., no background noise is present). Alternatively and/or in addition, a new spatial-temporal filter can be created and stored in the spatial audio database 114 (e.g., in response to a confidence level being below a threshold level and no match is identified). For example, the ASR engine 128 and/or an adaptive noise discrimination component can dynamically update the spatial audio database 114 with a new sound (e.g., new background sound) received from the microphones 112-1 . . . 112-N.

Figure 2:
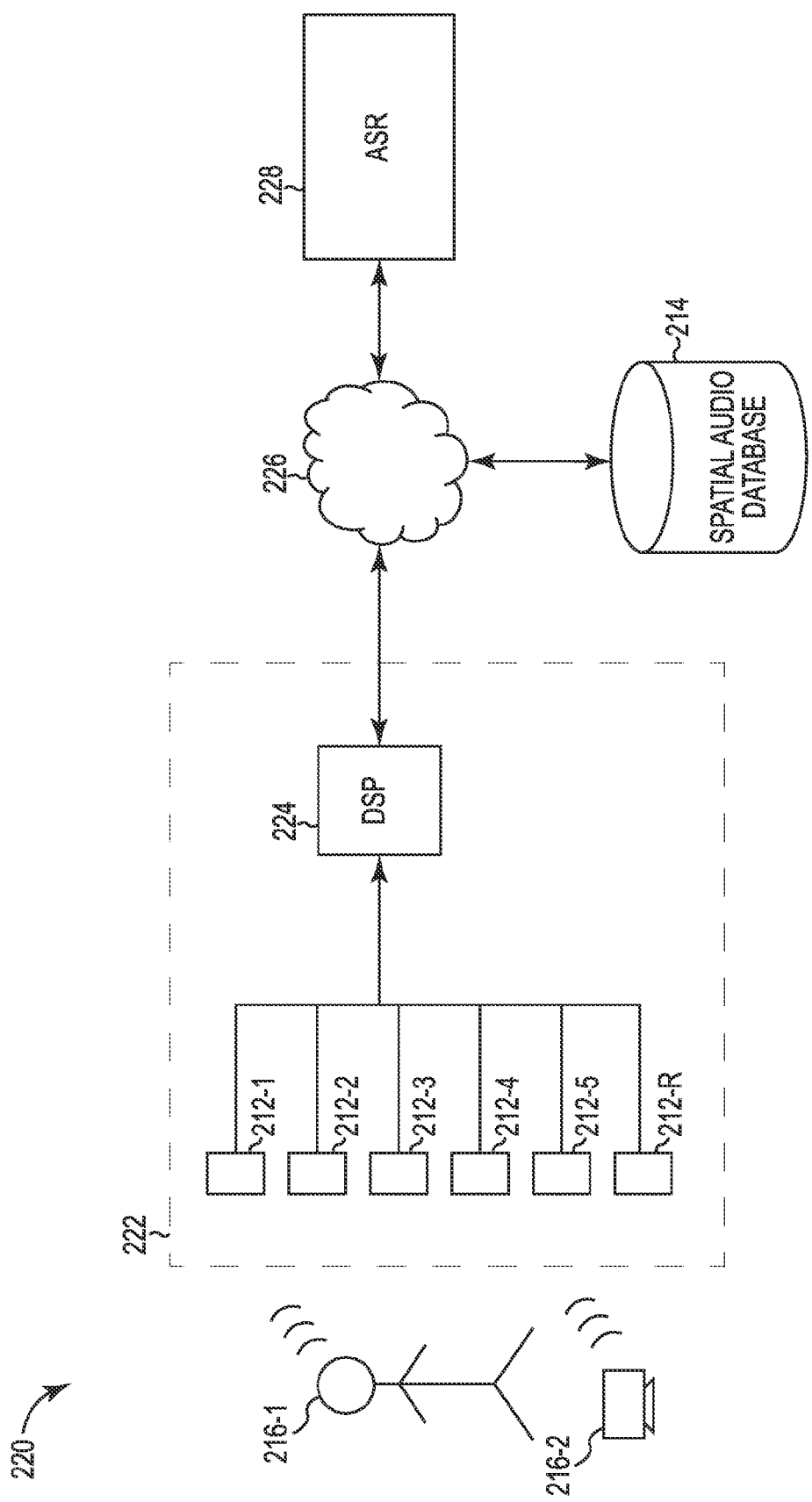
FIG. 2 illustrates an example of a speech recognition system according to one or more embodiments of the present disclosure.

FIG. 2 illustrates a speech recognition system 220 in accordance with one or more embodiments of the present disclosure. As shown in FIG. 2, speech recognition system 220 can include a sound recognition device 222. Sound recognition device 222 can be, for example, a thermostat. However, embodiments of the present disclosure are not limited to a particular type of sound recognition device, as previously described herein in connection with FIGS. 1A and 1B.

As shown in FIG. 2, sound recognition device 222 can include a plurality (e.g., an array) of microphones 212-1, 212-2, 212-3, 212-4, 212-5 . . . , 221-R. The microphones 212-1 . . . 212-R can capture sound 216-1, 216-2 in an area, such as, for instance, area 110 previously described in connection with FIG. 1B. The captured sound(s) 216-1, 216-2 can include, for example, a speech (e.g., voice) command issued by a speaker 216-1 in the area, as well as background noise 216-2 present in the area, in a manner analogous to that previously described in connection with FIGS. 1A and 1B.

As shown in FIG. 2, sound recognition device 222 can include a digital signal processor (DSP) 224. DSP 224 can receive the sound captured 216-1, 216-2 by the microphones 212-1 . . . 212-R and segregate the captured sound 216-1, 216-2 into a plurality of signals (e.g., signals 102-1, 102-2 . . . 0.102-M, as illustrated in FIG. 1A). DSP 224 can form signals (e.g., beams) using a beam former algorithm, in a manner analogous to DSP 124 previously described herein in connection with FIG. 1A.

Each respective signal can correspond to (e.g., include the sound from) a different portion of the area. For example, each respective signal can correspond to a different angular portion (e.g., segment) of the area with respect to sound recognition device 222, in a manner analogous to that previously described in connection with FIGS. 1A and 1B.

As shown in FIG. 2, the speech recognition system 220 can include an automatic speech recognition (ASR) engine 228 and a spatial audio database 214 that is separate from the sound recognition device 222. For example, the ASR engine 228 can be communicatively coupled to the sound recognition device 222 via a network 226, as illustrated in FIG. 2. For instance, the ASR engine 228 can be part of a computing device and/or server that is communicatively coupled to the sound recognition device 222 via network 226.

Network 226 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 226) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 226 can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

During a training mode (e.g., upon installation of the sound recognition device 222), the sound recognition device 222 (e.g., DSP 224) can send (e.g., transmit) signals to the ASR engine 228 (and/or an adaptive noise discrimination component) via the network 226 to create the spatial audio database 114. For example, the sounds 216-1, 216-2 received from the microphones 212-1 . . . 212-R in the area associated with the sound recognition device 222 can be used to create the spatial audio database 214. The ASR engine 228 can process the signals to recognize identification characteristics of the sounds captured 216-1, 216-2 (e.g., background noises) and store a signal with the identification characteristics in storage (e.g., the spatial audio database 214), in a manner analogous to ASR engine 128 previously described in connection with FIGS. 1A and 1B.

As shown in FIG. 2, the sound recognition device 222 (e.g., DSP 224) can send signals to the ASR engine 228 via network 226. ASR engine 228 can then separately (e.g., one at a time) process each of the signals to recognize the speech command issued by the speaker 216-1, in a manner analogous to ASR engine 128 previously described in connection with FIG. 1.

The ASR engine 228 can compare the signals (e.g., the sound segregated into a plurality of signals) to the spatial audio database 214 upon receiving the signals and/or, in some embodiments, can compare a signal when the processed signal does not meet a confidence level threshold. For example, in accordance with some embodiments, if the confidence level does not meet a threshold, the ASR engine 228 can compare the one or more signals to the spatial audio database 214.

Comparing the one or more signals to the spatial audio database 214 can be used to discriminate a speech command from one or more background noises contained in the signals. The discrimination can include subtraction techniques to suppress the background noise from the speech command. For example, the subtraction technique can include a spatial-temporal filter. Once the speech command is discriminated from the background noise, the ASR engine 228 can be used to recognize the speech command (e.g., determine an instruction based on the discriminated speech command).

Upon recognition of the speech command, the ASR engine 228 can send, via network 226, the instruction to the sound recognition device 222 to take the appropriate action requested by the command (e.g., perform the command), and the sound recognition device 222 can take the action based on (e.g., in response to) the instruction. For instance, upon recognition of the speech command, the ASR engine 228 can send, via network 226, an instruction to the sound recognition device 222 to adjust its operation (e.g., its operating parameters), and the sound recognition device 222 can adjust its operation based on (e.g., in response to) the instruction.

As an example in which sound recognition device 222 is a thermostat, the speaker 216-1 may issue a speech command to adjust (e.g., raise or lower) the temperature of the area, either generally or to a specific temperature. ASR engine 228 can recognize the command, and send an instruction, via network 226, to sound recognition device 222 to adjust the room temperature accordingly.

Although the present embodiment illustrates the ASR engine 228 performing the functions of creating the spatial audio database 214 and discriminating a speech command from a background noise based on a comparison to the spatial audio database 214, embodiments are not so limited. For instance, an adaptive noise discrimination component, as previously discussed, can perform such functions.

Figure 3:
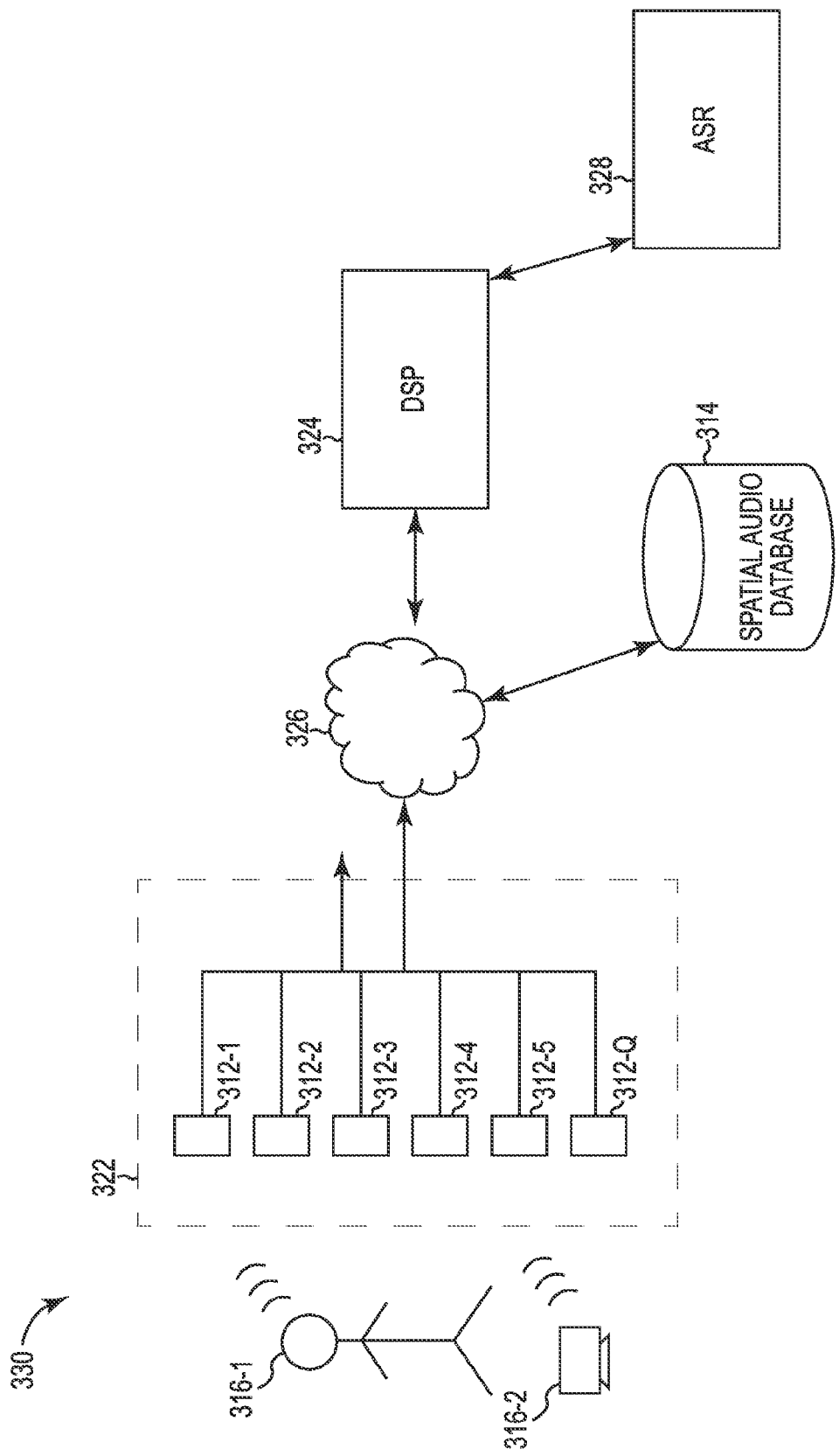
FIG. 3 illustrates an example of a speech recognition system according to one or more embodiments of the present disclosure.

FIG. 3 illustrates a speech recognition system 330 in accordance with one or more embodiments of the present disclosure. As shown in FIG. 3, speech recognition system 330 can include a sound recognition device 322. Sound recognition device 322 can be, for example, a thermostat. However, embodiments of the present disclosure are not limited to a particular type of sound recognition device, as previously described in connection with FIGS. 1A and 1B.

As shown in FIG. 3, the sound recognition device 322 can include a plurality (e.g., an array) of microphones 312-1, 312-2, 312-3, 312-4, 312-5 . . . , 352-Q. The microphones 312-1 . . . 312-Q can capture sound 316-1, 316-2 in an area, such as, for instance, area 110 previously described in connection with FIG. 1B. The captured sound 316-1, 316-2 can include, for example, a speech (e.g., voice) command issued by a speaker in the area, as well as background noise present in the area, in a manner analogous to that previously described in connection with FIGS. 1A and 1B.

As shown in FIG. 3, the speech recognition system 330 can include a digital signal processor (DSP) 324, an automatic speech recognition (ASR) engine 328, and a spatial audio database 314 that are separate from the sound recognition device 322. For example, the DSP 324, the ASR engine 328, and the spatial audio database 314 can be communicatively coupled to the sound recognition device 322 via a network 326, as illustrated in FIG. 3. For instance, the DSP 324, ASR engine 328, and spatial audio database 314 can be part of a computing device and/or server that is communicatively coupled to the sound recognition device 322 via network 326. The network 326 can be analogous to the network 226 previously described herein in connection with FIG. 2.

As shown in FIG. 3, the sound recognition device 322 (e.g., microphones 312-1 . . . 312-Q) can send the captured sound 316-1, 316-2 to DSP 324 via network 326. DSP 324 can receive the captured sound 316-1, 316-2, and segregate the captured sound into a plurality of signals (e.g., signals 102-1 . . . 0.102-M, as illustrated in FIG. 1A). DSP 324 can form signals (e.g., beams) using a beam former algorithm, in a manner analogous to DSP 124 previously described herein in connection with FIG. 1A.

Each respective signal can correspond to (e.g., include the sound from) a different portion of the area. For example, each respective signal can correspond to a different angular portion (e.g., segment) of the area with respect to the sound recognition device 322, in a manner analogous to that previously described in connection with FIGS. 1A and 1B.

As shown in FIG. 3, the DSP 324 can send signals to ASR 328. During a training mode (e.g., upon installation of the sound recognition device 322), the DSP 324 can send signals to the ASR engine 328 via network 326 to create the spatial audio database 314. The ASR engine 328 (and/or an adaptive noise discrimination component) can process the signals to recognize identification characteristics of the sounds captured (e.g., background noises) and store a signal with the identification characteristics in storage (e.g., the spatial audio database 314), in a manner analogous to ASR engine 128 previously described in connection with FIGS. 1A and 1B. The background noises stored in the spatial audio database 314 can be updated, for instance, upon receiving a new sound (e.g., by the ASR 328 and/or an adaptive noise discrimination component).

The DSP 324 can send subsequent signals to the ASR 328 and the ASR 328 can then separately (e.g., one at a time) process each of the signals to recognize the speech command issued by the speaker, in a manner analogous to ASR 128 previously described in connection with FIG. 1. Upon recognition of the speech command, ASR 328 can send, via network 326, an instruction to sound recognition device 322 to take the appropriate action requested by the command, and sound recognition device 322 can take the action based on (e.g., in response to) the instruction, in a manner analogous to that previously described in connection with FIG. 2.

In some embodiments, the ASR engine 328 can compare the signals to the spatial audio database 314 and/or discriminate a background noise from a speech command based on the signal, in a manner analogous to that previously described in connection with FIGS. 1A and 1B. For example, the ASR engine 328 can compare the signals (e.g., the sound segregated into a plurality of signals) to the spatial audio database 314 upon receiving the signals and/or, in some embodiments, can compare signals when the processed signal does not meet a confidence level threshold. Alternatively, an adaptive noise discrimination component, as previously discussed, can perform such functions.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for spatial audio database based noise discrimination, comprising:
   capturing a sound by a plurality of microphones in an area;
   segregating the sound into a plurality of signals, wherein each signal corresponds to a respective portion of the area;
   comparing the plurality of signals to a spatial audio database of a plurality of portions of the area in response to identifying a confidence level of an instruction, based on a speech command issued by a user, of the captured sound being below a threshold level;
   discriminating a speech command and a background noise from the captured sound based on the comparison to the spatial audio database; and
   determining an instruction based on the discriminated speech command.

2. The method of claim 1, wherein the confidence level includes a percentage that corresponds to a likelihood a determined instruction correctly corresponds to the discriminated speech command.

3. The method of claim 1, wherein discriminating the speech command from background noise includes discriminating based on a threshold comparison between a user's voice and a background noise stored in the spatial audio database.

4. The method of claim 1, including capturing sounds in the area for the spatial audio database during an installation of the plurality of microphones.

5. The method of claim 4, including updating the spatial audio data base with a new sound captured in the area.

6. A non-transitory computer readable medium, comprising instructions executable by a processing resource to cause a computing device to:
   create a spatial audio database of a plurality of portions of an area;
   receive a sound segregated into a plurality of signals, wherein the sound is captured in the area and wherein each respective signal corresponds to a different portion of the area;
   compare the plurality of signals to the spatial audio database of a plurality of portions of the area in response to identifying a confidence level of an instruction, based on a speech command issued by a user, of the captured sound being below a threshold level;
   discriminate a speech command from a background noise based on the comparison of the plurality of signals to the spatial audio database;
   determine an instruction based on the discriminated speech command; and
   send the instruction to a sound recognition device in the area to perform the command.

7. The medium of claim 6, wherein the instructions to create the spatial audio database include instructions executable by the processing resource to:
   use a plurality of sounds received from a plurality of microphones associated with the sound recognition device to create the spatial audio database.

8. The medium of claim 7, including instructions executable by the processing resource to segregate each of the plurality of sounds into the plurality of signals.

9. The medium of claim 7, wherein the instructions to create the spatial audio database include instructions executable by the processing resource to process the plurality of signals to recognize identification characteristics of the sounds captured.

10. The medium of claim 6, wherein the instructions to compare the received sound to the spatial audio database include instructions executable by the processing resource to identify if the background noise exists in the plurality of signals based on the comparison.

11. The medium of claim 6, wherein the instructions to compare the received sound includes instructions executable by the processing resource to compare the plurality of signals to a signal reception threshold to confirm a type of background noise present and/or the background noise mixed with the speech command.

12. The medium of claim 6, wherein the instructions to discriminate the speech command include instructions executable by the processing resource to use a subtraction technique to suppress the background noise from the speech command.

13. The medium of claim 6, wherein instructions to discriminate the speech command include instructions executable by the processing resource to discriminate the speech command from the background noise based on a threshold comparison of the plurality of signals and a sound stored in the spatial audio database.

14. A system, comprising:
   an array of microphones to capture sounds from a plurality of beam directions and a plurality of beam widths;
   a digital signal processor to segregate each captured sound into a plurality of signals wherein each respective signal corresponds to a different angular portion of the area;
   an adaptive noise discrimination component to:
      create a spatial audio database using the segregated plurality of signals corresponding to different angular portions of the area of each captured sound;
      compare a subsequently captured sound to the spatial audio database of a plurality of portions of the area in response to identifying a confidence level of an instruction, based on a speech command issued by a user, of the captured sound being below a threshold level; and
      discriminate a speech command from a background noise based on the comparison of the subsequently captured sound to the spatial audio database; and
   an automatic speech recognition engine to analyze the discriminated speech command at the defined beam direction and defined beam width.

15. The system of claim 14, wherein the adaptive noise discrimination component:
   in response to the comparison resulting in an identified background noise, discriminates the speech command from background noise using a spatial-temporal filter; and
   in response to the comparison resulting in no identified background noise, sends the speech command to the automatic speech recognition engine.

16. The system of claim 14, wherein the automatic speech recognition engine sends feedback to the digital signal processor, including at least one of:
   an alternate beam angle from the plurality of beam angles; and
   an alternate beam width from the plurality of beam widths.

17. The system of claim 14, wherein the array of microphones, the digital signal processor, and the automatic speech recognition engine are included in a sound recognition device.

18. The system of claim 14, wherein:
the area of microphones and the digital speech processor are included in a sound recognition device; and
the automatic speech recognition engine is communicatively coupled to the sound recognition device via a network.

19. The system of claim 14, wherein:
the array of microphones are included in a sound recognition device; and
the digital speech processor and the automatic speech recognition engine are communicatively coupled to the sound recognition device via a network.

\* \* \* \* \*